J. T. ROBERTS.
SPRING DEVICE FOR AUTOMOBILES.
APPLICATION FILED DEC. 10, 1920.
1,376,040.
Patented Apr. 26, 1921.
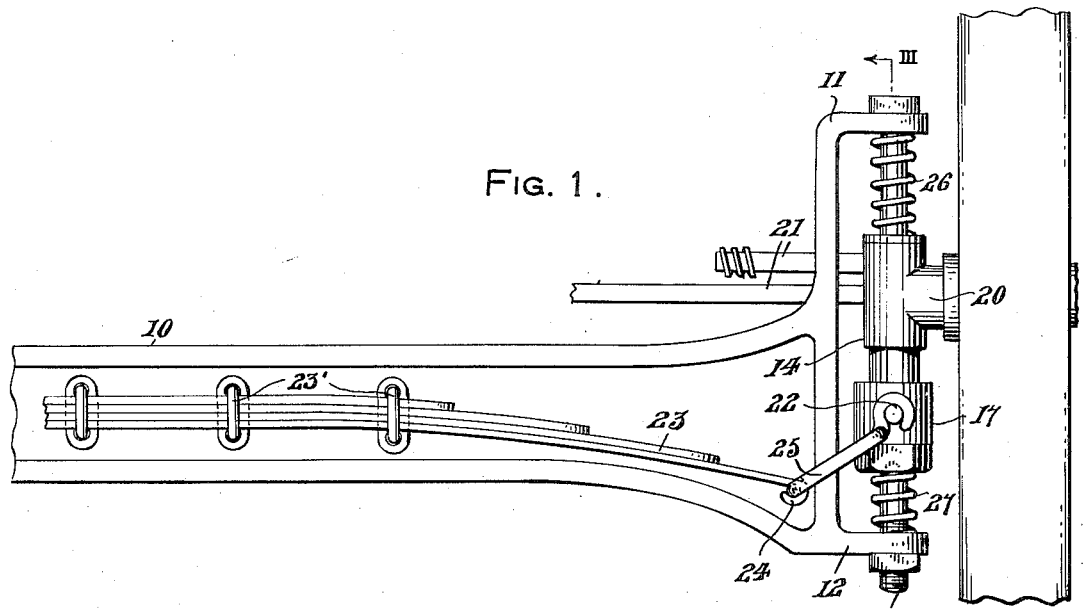
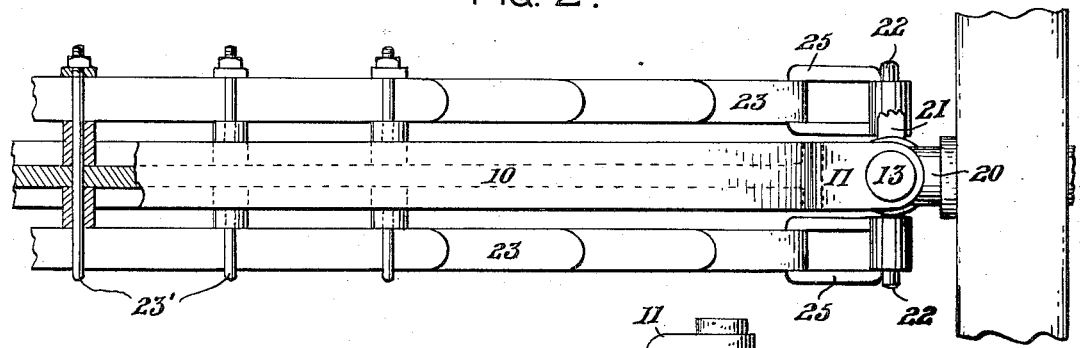
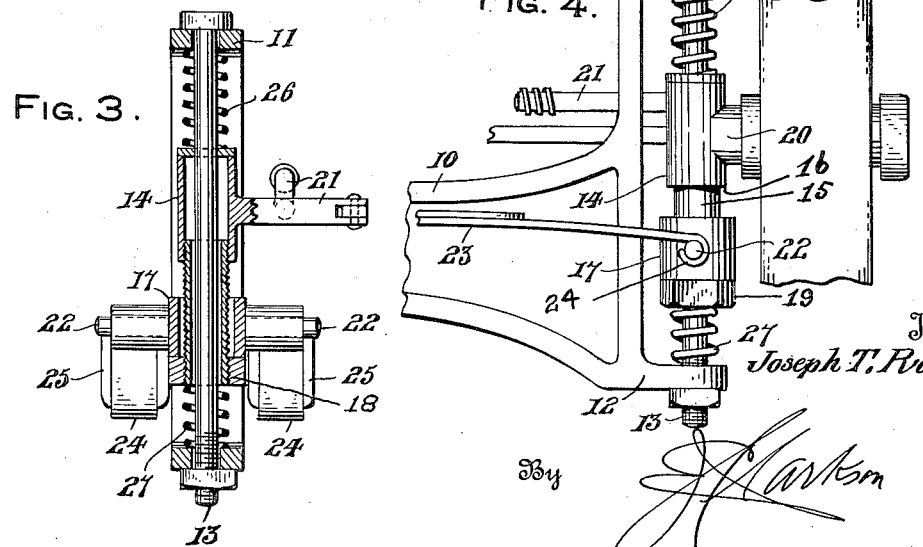
Inventor
Joseph T. Roberts
By
Attorney

UNITED STATES PATENT OFFICE.

JOSEPH T. ROBERTS, OF SHELBYVILLE, KENTUCKY.

SPRING DEVICE FOR AUTOMOBILES.

1,376,040.  Specification of Letters Patent.  Patented Apr. 26, 1921.

Application filed December 10, 1920. Serial No. 429,633.

*To all whom it may concern:*

Be it known that I, JOSEPH T. ROBERTS, a citizen of the United States of America, residing at Shelbyville, in the county of Shelby and State of Kentucky, have invented certain new and useful Improvements in Spring Devices for Automobiles, of which the following is a specification.

This invention relates to steering axles for automobiles and other like vehicles wherein stub axles are pivoted to a main axle member. More especially the invention relates to spring suspensions for automobile stub axles.

One important object of this invention is to improve and simplify the general construction of devices of this character.

It is a recognized fact that cantaliver springs have certain inherent qualities that tend to produce an easy riding vehicle when they are used to support the vehicle on its wheels.

A second important object of the invention is to provide a steering axle construction of improved character wherein such cantaliver springs will constitute the main spring elements used for carrying the vehicle in such a way that it floats on its stub axles.

A third important object of the invention is to provide, in the improved construction, means for varying or adjusting the working tension of the cantaliver springs employed in the device.

With the above and other objects in view, as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1 is a side elevation of one form of the improved spring suspension.

Fig. 2 is a plan view thereof.

Fig. 3 is a section on the line 3—3 of Fig. 1.

Fig. 4 is a side elevation of a modified form of the device.

In both embodiments of the device as herein disclosed there is provided a main axle member 10 on the end of which is formed or fixed a yoke having arms 11 and 12 disposed in vertical alinement. Through these arms extends a pivot pin 13 whereon is slidably and rotatably mounted a sleeve having a relatively large upper end 14 and a relatively small lower end 15, the two ends being formed to have a shoulder 16 therebetween. This shoulder 16 forms an upper limit stop to limit the upward movement of a cuff 17 which is slidably and rotatably mounted on the smaller end 15 of the sleeve, this end of the sleeve being provided with a screw threaded lower extremity 18 to receive a nut 19 forming the lower limit stop for the cuff 17.

Projecting laterally from the sleeve end 14 is a stub axle 20 and substantially at right angles thereto extends an arm 21 to afford connection for the steering mechanism of the vehicle.

From the cuff 17 project the oppositely disposed pins 22 affording means for the connection of cantaliver springs 23 arranged respectively in front and rear of the member 10 and each having one end firmly secured to said member 10 as by spring clips 23'. The outer or free ends of these springs are hook shaped as at 24 and, in the form shown in Figs. 1, 2 and 3, these hooks engage the lower ends of links 25, the upper ends of said links being pivoted on the pins 22. In the form shown in Fig. 4 the hooks are engaged directly on the pins.

From this construction it will be seen that the working tension of the springs may be increased by screwing the nut upward on the sleeve or may be decreased by unscrewing said nut.

Auxiliary coil springs 26 and 27 are also used, these springs surrounding the pivot pin above and below the sleeve.

There has thus been provided a simple and efficient device of the kind described and for the purpose specified.

It is obvious that minor changes may be made in the form and construction of the invention without departing from the material principles thereof. It is not therefore desired to confine the invention to the exact form shown and described but it is wished to include all such as come within the scope claimed.

Having thus described the invention, what is claimed as new, is:—

1. In combination, an axle member having a vertically disposed yoke, a pivot pin extending between the arms of the yoke, a sleeve slidably and rotatably mounted on the pin, a stub axle carried by the sleeve, and leaf springs each having one end secured to the axle member and the other end operatively connected with the sleeve.

2. In combination, an axle member having a vertically disposed yoke, a pivot pin extending between the arms of the yoke, a sleeve slidably and rotatably mounted on the pin, a stub axle carried by the sleeve, leaf springs each having one end secured to the axle member and the other end operatively connected with the sleeve, and means to vary the tension of said springs.

3. In combination, a main axle member having a vertically disposed yoke, a pivot pin extending between the arms of the yoke, a sleeve slidably and rotatably mounted on the pin, a stub axle on said sleeve, a cuff rotatably mounted on said sleeve and slidable within limits thereon, and cantaliver springs fixed to the main axle member and having their free ends connected to the cuff.

4. In combination, a main axle member having a vertically disposed yoke, a pivot pin extending between the arms of the yoke, a sleeve slidably and rotatably mounted on the pin, a stub axle on said sleeve, a cuff rotatably mounted on said sleeve and slidable within limits thereon, oppositely disposed pins projecting from the cuff, links pivotally mounted on said springs, and cantaliver springs fixed to said main axle member and having their free ends engaged with the free ends of said links.

5. In combination, a main axle member, a vertically disposed yoke at the end of the main axle member, a pin extending between the arms of the yoke, a sleeve slidably and rotatably mounted on the pin and having a reduced lower end screw threaded at its lower extremity, a stub axle projecting from the upper part of the sleeve, a cuff slidably and rotatably mounted on the lower part of the sleeve, a nut on the threaded portion of the sleeve to force the cuff upward therealong, a pair of pins projecting from said cuff, links each having one end pivotally mounted on a pin, and cantaliver springs each having one end fixed to the main axle member and its remaining end engaging the lower end of a respective link.

In testimony whereof I affix my signature.

JOSEPH T. ROBERTS.